(12) United States Patent
Uhrich et al.

(10) Patent No.: US 9,574,509 B2
(45) Date of Patent: Feb. 21, 2017

(54) SYSTEM AND METHOD FOR EXHAUST GAS RECIRCULATION ESTIMATION WITH TWO INTAKE OXYGEN SENSORS

(71) Applicant: Ford Global Technologies, LLC, Dearborn, MI (US)

(72) Inventors: Michael James Uhrich, West Bloomfield, MI (US); Imtiaz Ali, Lathrup Village, MI (US); Timothy Joseph Clark, Livonia, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 14/573,020

(22) Filed: Dec. 17, 2014

(65) Prior Publication Data

US 2016/0177853 A1 Jun. 23, 2016

(51) Int. Cl.
*F02D 41/00* (2006.01)
*F02M 25/07* (2006.01)
(Continued)

(52) U.S. Cl.
CPC ......... *F02D 41/0077* (2013.01); *F02B 37/007* (2013.01); *F02D 41/0052* (2013.01);
(Continued)

(58) Field of Classification Search
CPC F02D 41/0077; F02D 41/0052; F02D 41/144; F02D 41/1441; F02D 41/1454; F02D 41/26; F02D 41/0007; F02D 21/08; F02B 33/40; F02B 37/007; F02M 25/06; F02M 25/0712;F02M 25/0753; F02M 25/077; F02M 25/0836; F02M 25/0854; F02M 25/089; F02M 26/09; F02M 26/17; F02M 26/45; F02M 26/46
(Continued)

(56) References Cited

U.S. PATENT DOCUMENTS 4,614,175 A * 9/1986 Asayama ............ F02D 41/0052
123/568.26
4,790,286 A * 12/1988 Nishida ............... F02D 41/0052
123/568.27

(Continued)

OTHER PUBLICATIONS

Surnilla, Gopichandra et al., "Methods and Systems for Adjusting EGR Based on a Impact of PCV Hydrocarbons on an Intake Oxygen Sensor," U.S. Appl. No. 14/252,693, filed Apr. 14, 2014, 63 pages.

(Continued)

*Primary Examiner* — Hung Q Nguyen
*Assistant Examiner* — John Bailey
(74) *Attorney, Agent, or Firm* — Julia Voutyras; John D. Russell; B. Anna McCoy

(57) ABSTRACT

Methods and systems are provided for estimating exhaust gas recirculation (EGR) flow based on outputs of two different intake oxygen sensors arranged in an engine intake system. In one example, a method may include, when the engine is boosted, adjusting exhaust gas recirculation (EGR) based on a first output of a first oxygen sensor positioned in an intake passage and exposed to EGR gases and a second output of a second oxygen sensor not exposed to EGR gases and exposed to positive crankcase ventilation and purge flow gases. For example, EGR flow may be estimated based on a difference between the first output and the second output.

20 Claims, 5 Drawing Sheets

(51) Int. Cl.
*F02B 37/007* (2006.01)
*F02M 35/10* (2006.01)
*F02M 25/06* (2016.01)
*F02M 25/08* (2006.01)
*F02D 41/14* (2006.01)
*F02B 37/16* (2006.01)
*F02B 37/18* (2006.01)

(52) U.S. Cl.
CPC ....... *F02D 41/144* (2013.01); *F02D 41/1441* (2013.01); *F02D 41/1454* (2013.01); *F02M 25/06* (2013.01); *F02M 25/089* (2013.01); *F02M 26/17* (2016.02); *F02M 35/10157* (2013.01); *F02M 35/10222* (2013.01); *F02M 35/10373* (2013.01); *F02B 37/16* (2013.01); *F02B 37/18* (2013.01)

(58) Field of Classification Search
USPC ....... 701/101, 103, 104, 108, 109; 60/605.1, 60/611
See application file for complete search history.

(56) References Cited

U.S. PATENT DOCUMENTS

| | | | | |
|---|---|---|---|---|
| 4,836,174 A * | 6/1989 | Chujo | ............... | F02D 41/144 123/676 |
| 5,203,870 A * | 4/1993 | Kayanuma | ......... | F02M 25/0809 123/198 D |
| 5,889,196 A * | 3/1999 | Ueno | ............... | G01N 27/407 204/429 |
| 6,000,385 A * | 12/1999 | Fukuma | ............ | F02D 41/0072 123/568.16 |
| 6,739,177 B2 * | 5/2004 | Sato | ............... | F02D 41/0037 73/114.71 |
| 6,742,379 B2 | 6/2004 | Matsubara et al. | | |
| 7,047,933 B2 * | 5/2006 | Gray, Jr. | ............ | F01N 3/035 123/305 |
| 7,267,117 B2 * | 9/2007 | Tonetti | ............ | F02D 41/0072 123/568.11 |
| 8,469,010 B2 * | 6/2013 | Inoue | ............... | F01M 13/022 123/568.14 |
| 8,521,354 B2 * | 8/2013 | Sasaki | ............ | F02D 41/0072 701/29.1 |
| 8,554,446 B2 * | 10/2013 | Sano | ............... | F02D 13/06 123/198 DB |
| 8,594,908 B2 * | 11/2013 | Yoshikawa | ...... | F02M 35/10222 123/568.17 |
| 9,188,087 B2 * | 11/2015 | Surnilla | ............... | F02M 25/089 |
| 9,448,136 B2 * | 9/2016 | Higuchi | ............ | G01M 15/106 |
| 2002/0014103 A1 * | 2/2002 | Matsubara | ............ | F02D 41/144 73/1.06 |
| 2002/0139360 A1 * | 10/2002 | Sato | ............... | F02D 41/0037 123/698 |
| 2005/0139193 A1 * | 6/2005 | Kobayashi | ............ | F02M 26/23 123/350 |
| 2012/0037134 A1 * | 2/2012 | Jankovic | ............ | F02D 41/0002 123/568.21 |
| 2012/0117011 A1 * | 5/2012 | Hashimoto | ......... | F02D 13/0226 706/23 |
| 2013/0199177 A1 * | 8/2013 | Holberg | ............... | F02D 41/144 60/605.2 |
| 2013/0268176 A1 * | 10/2013 | Song | ............... | F02M 35/10393 701/102 |
| 2015/0101564 A1 * | 4/2015 | Surnilla | ............... | F02D 43/00 123/294 |
| 2015/0136095 A1 * | 5/2015 | Ante | ............... | F02M 35/10373 123/568.12 |
| 2016/0061153 A1 * | 3/2016 | Jeffrey | ............... | F02M 25/0809 123/520 |

OTHER PUBLICATIONS

Hakeem, Mohannad et al., "Methods and Systems for Determining a Fuel Concentration in Engine Oil Using an Intake Oxygen Sensor," U.S. Appl. No. 14/252,679, filed Apr. 14, 2014, 63 pages.
Vigild, Christian W. et al., "Methods and Systems for Fuel Canister Purge Flow Estimation with an Intake Oxygen Sensor," U.S. Appl. No. 14/155,261, filed Jan. 14, 2014, 51 pages.
Surnilla, Gopichandra et al., "Methods and Systems for PCV Flow Estimation with an Intake Oxygen Sensor," U.S. Appl. No. 14/073,480, filed Nov. 6, 2013, 52 pages.
Surnilla, Gopichandra et al., "Methods and Systems for an Intake Oxygen Sensor," U.S. Appl. No. 14/032,103, filed Sep. 19, 2013, 43 pages.
Surnilla, Gopichandra et al., "Methods and Systems for an Intake Oxygen Sensor," U.S. Appl. No. 14/032,109, filed Sep. 19, 2013, 44 pages.

* cited by examiner

SYSTEM AND METHOD FOR EXHAUST GAS RECIRCULATION ESTIMATION WITH TWO INTAKE OXYGEN SENSORS

FIELD

The present description relates generally to a gas constituent sensor included in an intake system of an internal combustion engine.

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and/or improve fuel economy. An EGR system may include various sensors to measure and/or control the EGR. As one example, the EGR system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. The EGR system may additionally or optionally include an exhaust gas oxygen sensor coupled to the exhaust manifold for estimating a combustion air-fuel ratio.

As such, due to the location of the oxygen sensor downstream of a charge air cooler in the high pressure air induction system, the sensor may be sensitive to the presence of fuel vapor and other reductants and oxidants such as oil mist. For example, during boosted engine operation, purge air may be received at a compressor inlet location. Hydrocarbons ingested from purge air, positive crankcase ventilation (PCV) and/or rich EGR can consume oxygen on the sensor catalytic surface and reduce the oxygen concentration detected by the sensor. In some cases, the reductants may also react with the sensing element of the oxygen sensor. The reduction in oxygen at the sensor may be incorrectly interpreted as a diluent when using the change in oxygen to estimate EGR. Thus, the sensor measurements may be confounded by the various sensitivities, and the accuracy of the sensor, and thus, measurement and/or control of EGR, may be reduced.

In one example, some of the above issues may be addressed by a method for an engine comprising: during boosted operation, adjusting exhaust gas recirculation (EGR) based on a first output of a first oxygen sensor positioned in an intake passage and exposed to EGR gases and a second output of a second oxygen sensor not exposed to EGR gases and exposed to positive crankcase ventilation and purge flow gases. In this way, the effect of purge and PCV hydrocarbons on an intake oxygen sensor output may be accounted for and used to determine a more accurate EGR estimate using two intake oxygen sensors.

For example, the first oxygen sensor may be positioned in an intake passage of the engine, downstream of where an EGR passage couples to the intake passage. The second oxygen sensor may be positioned in the intake passage upstream of where the EGR passage couples to the intake passage and downstream of where positive crankcase ventilation (PCV) and purge flow hydrocarbons enter the intake passage during boosted engine operation. As such, the first intake oxygen sensor may be exposed to both EGR flow and purge and PCV flow hydrocarbons and the second oxygen sensor may be exposed to just purge and PCV flow hydrocarbons when the engine is boosted. EGR may then be estimated based on a difference between a first output of the first oxygen sensor and a second output of the second oxygen sensor. A controller may then adjust EGR based on the estimated EGR. By taking a difference of the two oxygen sensor outputs, the effect of purge and PCV hydrocarbons on the first output may be removed, thereby increasing an accuracy of the EGR estimate and the resulting EGR control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
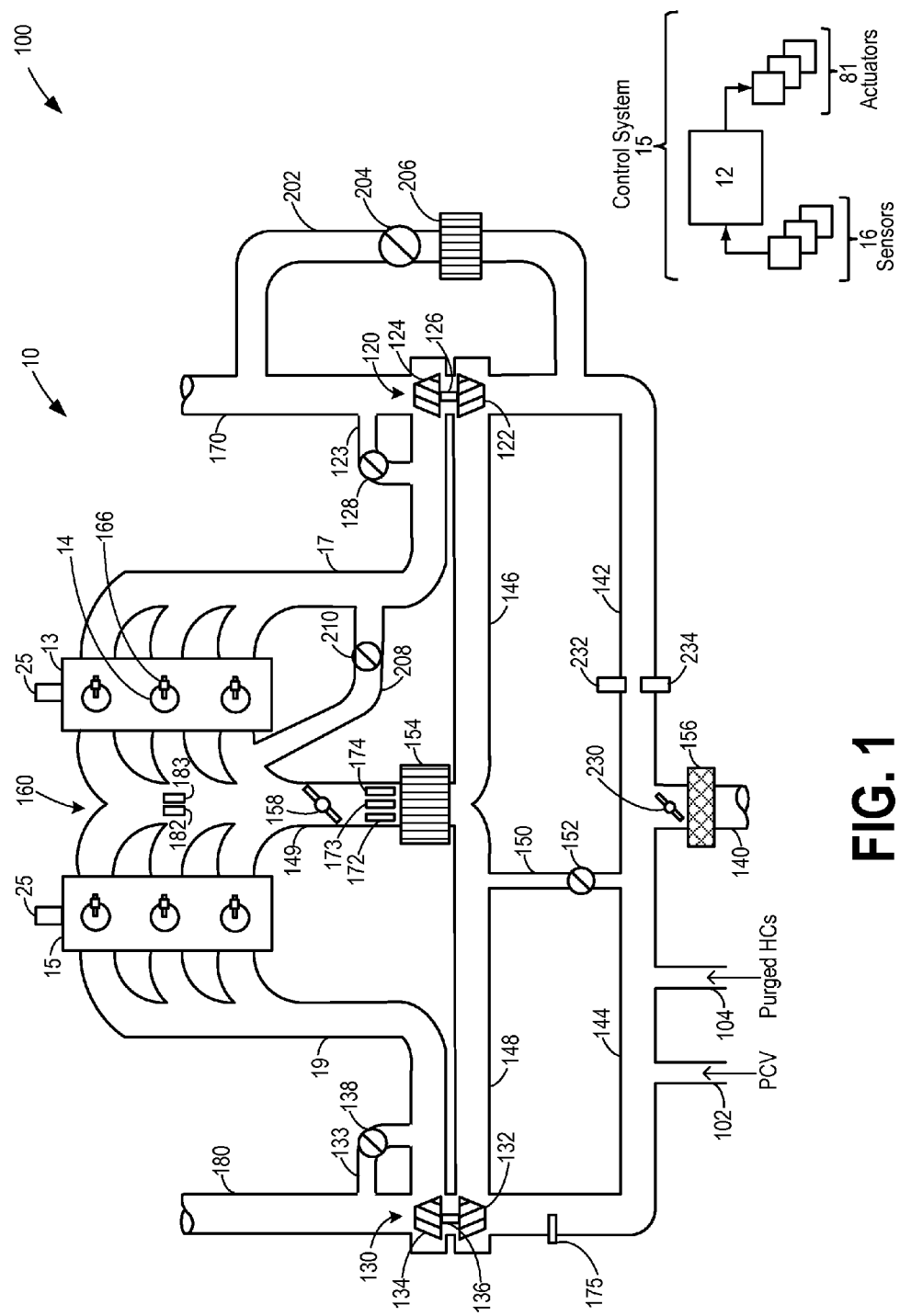
FIGS. 1-2 are schematic diagrams of an engine system.
Figure 2:
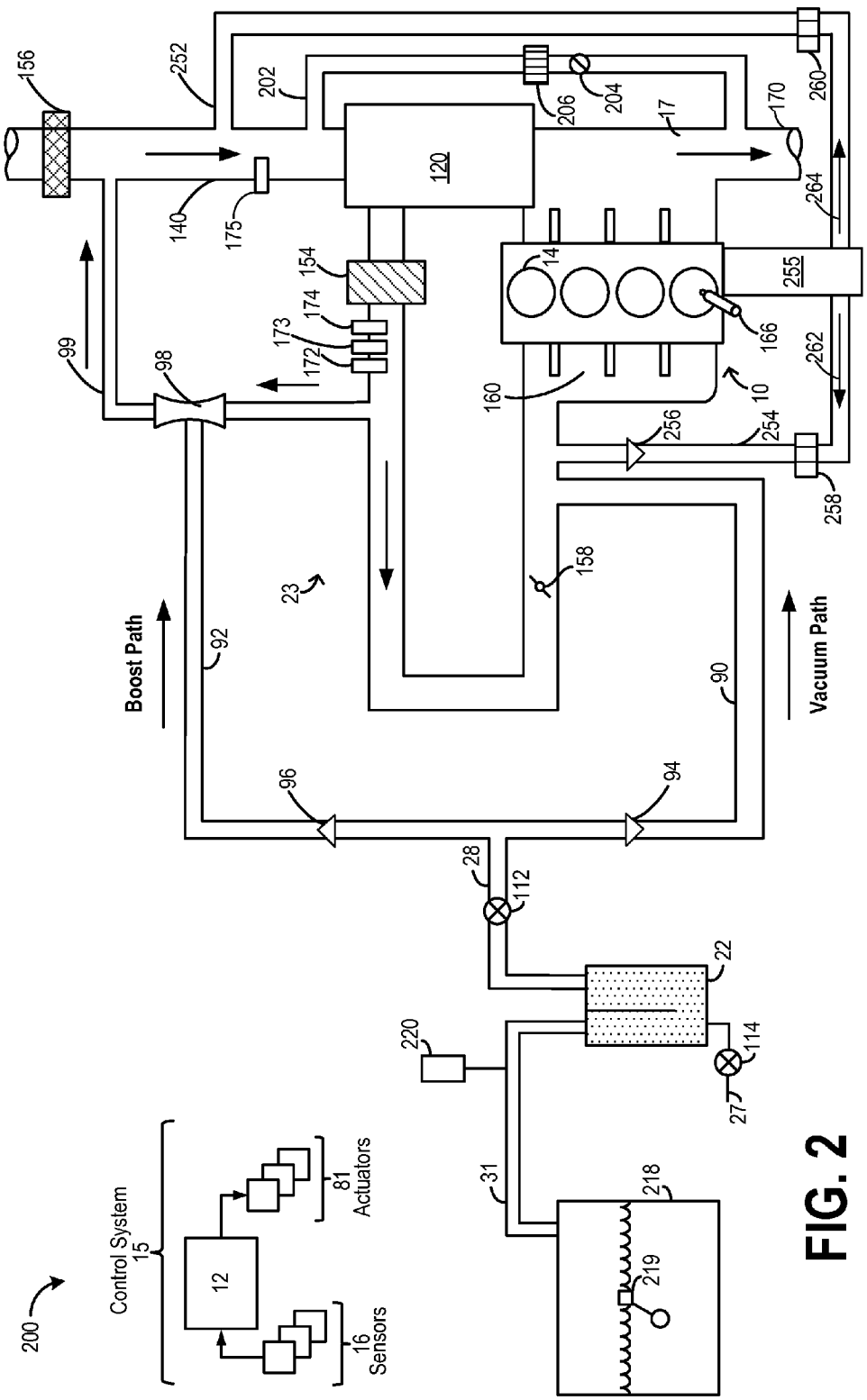
Figure 3:
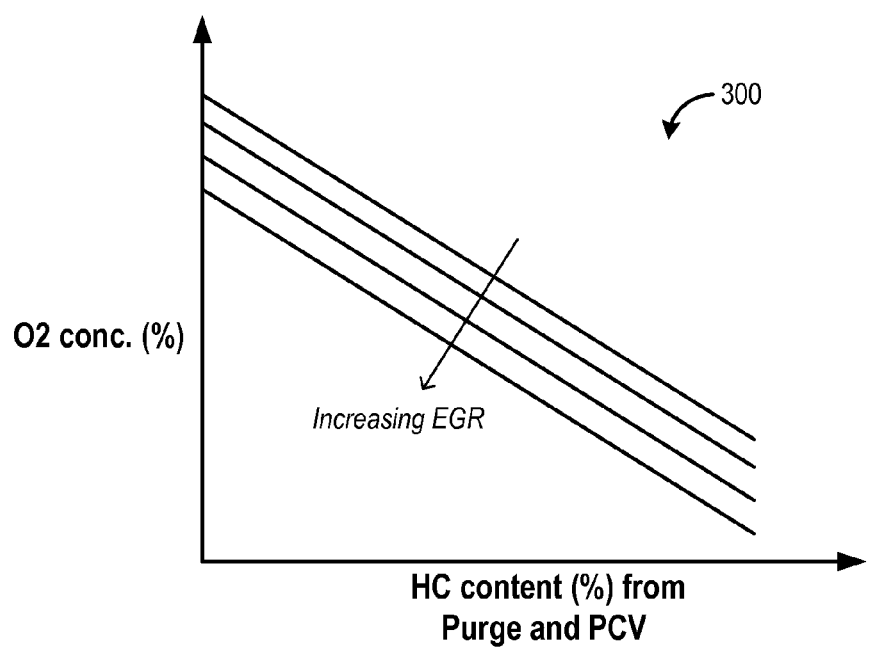
FIG. 3 is a graph depicting the impact of purge and PCV air on the oxygen concentration estimated by an intake manifold oxygen sensor.

The following description relates to systems and methods for estimating exhaust gas recirculation (EGR) flow during boosted and non-boosted engine conditions. As shown in FIGS. 1-2, a turbocharged engine may include an intake oxygen sensor located in an intake passage of the engine and a low pressure exhaust gas recirculation (EGR) system to recirculate exhaust gasses to the intake passage. During non-boosted engine conditions, the oxygen sensor may be used to estimate EGR flow by comparing oxygen concentrations of the oxygen sensor to estimations made when EGR was shut off. However, during boosted conditions when purge (e.g., fuel canister purge flow) and positive crankcase ventilation (PCV) gasses pass the oxygen sensor, outputs of the oxygen sensor may be corrupted by the additional hydrocarbons in the purge and PCV gasses. As shown in FIG. 3, increased purge and PCV gasses during boosted conditions may result in decreased oxygen concentration estimates from the oxygen sensor. As a result, the EGR flow amount may be overestimated. Therefore, a second oxygen sensor, as shown in FIGS. 1-2, may be incorporated into the engine system and positioned such that it does not receive EGR gasses but may receive purge and PCV gasses during boosted engine conditions. FIG. 5 shows how the oxygen concentrations estimated by the two oxygen sensors may be affected by purge, PCV and EGR flow under both boosted and non-boosted conditions. Any differences between the oxygen concentrations estimated by the two differently located oxygen sensors may be used to infer an EGR flow amount during both boosted and non-boosted engine conditions, as described in the method of FIG. 4. Alternatively, during non-boosted engine conditions, the first oxygen sensor may be used exclusively to estimate the EGR flow, as described earlier.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include a charge air cooler (CAC) 154 and/or a throttle (such as second throttle valve 158). The position of throttle valve 158 can be adjusted by the control system via a throttle actuator (not shown) communicatively coupled to controller 12. An anti-surge valve 152 may be provided to selectively bypass the compressor stages of turbochargers 120 and 130 via bypass passage 150. As one example, anti-surge valve 152 can open to enable flow through bypass passage 150 when the intake air pressure downstream of the compressors attains a threshold value.

Intake manifold 160 may further include an intake gas oxygen sensor 172 (herein also referred to as EGR oxygen sensor or an intake oxygen sensor). In one example, the oxygen sensor is a UEGO sensor. As elaborated herein, the intake gas oxygen sensor may be configured to provide an estimate regarding the oxygen content of fresh air received in the intake manifold. Specifically, the oxygen sensor may operate by applying a reference voltage, and estimating an oxygen concentration based on a pumping current generated by the applied voltage. In the depicted example, oxygen sensor 172 is positioned upstream of throttle 158 and downstream of charge air cooler 154. However, in alternate embodiments, the oxygen sensor may be positioned upstream of the CAC. Further, the intake oxygen sensor 172 is positioned in a common intake passage 149 downstream of the first and second parallel branched intake passages 146 and 148. A pressure sensor 174 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 174 is a TIP sensor. In alternate examples, the reference intake pressure is a manifold pressure (MAP) as sensed by MAP sensor 182.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 170, downstream of the turbine 124, to the first parallel intake passage 142, upstream of the compressor 122. In some embodiments, a second low-pressure EGR loop (not shown) may be likewise provided for recirculating at least some exhaust gas from the second branched parallel exhaust passage 180, downstream of the turbine 134, to the second parallel intake passage 144, upstream of the compressor 132. LP-EGR loop 202 may include LP-EGR valve 204 for controlling an EGR flow (i.e., an amount of exhaust gas recirculated) through the loops, as well as an EGR cooler 206 for lowering a temperature of exhaust gas flowing through the EGR loop before recirculation into the engine intake. Under certain conditions, the EGR cooler 206 may also be used to heat the exhaust gas flowing through LP-EGR loop 202 before the exhaust gas enters the compressor to avoid water droplets impinging on the compressors.

Engine 10 may further include a first high-pressure EGR loop 208 for recirculating at least some exhaust gas from the first parallel exhaust passage 17, upstream of the turbine 124, to intake manifold 160, downstream of intake throttle 158. Likewise, the engine may include a second high-pressure EGR loop (not shown) for recirculating at least some exhaust gas from the second parallel exhaust passage 18, upstream of the turbine 134, to the second branched parallel intake passage 148, downstream of the compressor 132. EGR flow through HP-EGR loops 208 may be controlled via HP-EGR valve 210.

A PCV port 102 may be configured to deliver crankcase ventilation gases (blow-by gases) to the engine intake manifold along second parallel intake passage 144. In some embodiments, flow of PCV air through PCV port 102 may be controlled by a dedicated PCV port valve. Likewise, a purge port 104 may be configured to deliver purge gases from a fuel system canister to the engine intake manifold along passage 144. In some embodiments, flow of purge air through purge port 104 may be controlled by a dedicated purge port valve.

Humidity sensor 232 and pressure sensor 234 may be included in only one of the parallel intake passages (herein, depicted in the first parallel intake air passage 142 but not in the second parallel intake passage 144), downstream of EGR throttle valve 230. Specifically, the humidity sensor and the pressure sensor may be included in the intake passage not receiving the PCV or purge air. Humidity sensor 232 may be configured to estimate a relative humidity of the intake air. In one embodiment, humidity sensor 232 is a UEGO sensor configured to estimate the relative humidity of the intake air based on the output of the sensor at one or more voltages.

Since purge air and PCV air can confound the results of the humidity sensor, the purge port and PCV port are positioned in a distinct intake passage from the humidity sensor. Pressure sensor 234 may be configured to estimate a pressure of the intake air. In some embodiments, a temperature sensor may also be included in the same parallel intake passage, downstream of the EGR throttle valve 230.

A second oxygen sensor 175, in addition to the first oxygen sensor 172, may be positioned downstream of the PCV port 102 and purge port 104, but upstream of the common intake passage 149. The second intake gas oxygen sensor 175 may be configured to provide an estimate regarding the oxygen content of fresh air received in parallel intake passage 144. Specifically, the second oxygen sensor 175 may operate by applying a reference voltage, and estimating an oxygen concentration based on a pumping current generated by the applied voltage. Second oxygen sensor 175 may be positioned upstream or downstream of the turbocharger 130. As depicted, the oxygen sensor 175 may be positioned downstream of the PCV port 102 and purge port 104, and upstream of the turbocharger 130 in the second parallel intake passage 144. However, in another embodiment, the oxygen sensor 175 may be positioned downstream of the turbocharger 130 and upstream of the common intake passage 149 in the second branched parallel intake passage 148. Thus, unlike first oxygen sensor 172, second oxygen sensor 175 is positioned in a part of the engine 10 through which EGR may flow. Said another way, the second oxygen sensor may not be exposed to exhaust gases (e.g., EGR flow), while the first oxygen sensor 172 may be exposed to both EGR flow and purge and PCV flow.

As such, during boosted conditions when PCV and purge gasses are flowing to the intake passage 149, first oxygen sensor 172 and second oxygen sensor 175 may each be used for independent oxygen concentration estimates. The difference between the estimates of the oxygen content from each oxygen sensor may then be used to infer an amount of EGR flow through the engine 10. First oxygen sensor 172 may receive PCV, purge air, and EGR flow in the intake air it measures. Since second oxygen sensor 175 may only receive PCV and purge air flow, any difference between the oxygen content estimated by the first oxygen sensor 172 and the second oxygen sensor 175 may be due to EGR flow. Thus, the two oxygen sensors may be used to estimate an EGR flow under boosted engine conditions, as elaborated later with reference to FIGS. 4-5. Under non-boosted engine conditions when turbochargers 120 and 130 are not operating (e.g., not boosting the intake air), purge and PCV may be delivered directly to the intake manifold 160, downstream of both the first oxygen sensor 172 and the second oxygen sensor 175. When the engine is operating in a non-boosted condition, differences in the oxygen content estimated by first oxygen sensor 172 and second oxygen sensor 175 may continue to be used to estimate the EGR flow. In another embodiment, under non-boosted engine conditions, the first oxygen sensor 172 may be used exclusively to estimate the EGR flow. Specifically, the oxygen content estimated from the first oxygen sensor 172 may be compared to a reference oxygen content determined when the EGR valve was closed and thus EGR gasses were not being recirculated to the intake passage 149. The difference between these two measurements from the first intake air oxygen sensor 172 may be used to infer an EGR flow.

Returning to FIG. 1, the position of intake and exhaust valves of each cylinder 14 may be regulated via hydraulically actuated lifters coupled to valve pushrods, or via a direct acting mechanical bucket system in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, MCT sensor 183, TIP sensor 174, and first intake air oxygen sensor 172. In some examples, common intake passage 149 may further include a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valves 210, LP-EGR valves 204, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4-5.

Now turning to FIG. 2, another example embodiment 200 of the engine of FIG. 1 is shown. As such, components previously introduced in FIG. 1 are numbered similarly and not re-introduced here for reasons of brevity.

Embodiment 200 shows a fuel tank 218 configured to deliver fuel to engine fuel injectors. A fuel pump (not shown) immersed in fuel tank 218 may be configured to pressurize fuel delivered to the injectors of engine 10, such as to injector 166. Fuel may be pumped into the fuel tank from an external source through a refueling door (not shown). Fuel tank 218 may hold a plurality of fuel blends, including fuel with a range of alcohol concentrations, such as various gasoline-ethanol blends, including E10, E85, gasoline, etc., and combinations thereof. A fuel level sensor 219 located in fuel tank 218 may provide an indication of the fuel level to controller 12. As depicted, fuel level sensor 219 may comprise a float connected to a variable resistor. Alternatively, other types of fuel level sensors may be used. One or more other sensors may be coupled to fuel tank 218 such as a fuel tank pressure transducer 220 for estimating a fuel tank pressure.

Vapors generated in fuel tank 218 may be routed to fuel vapor canister 22, via conduit 31, before being purged to engine intake 23. These may include, for example, diurnal and refueling fuel tank vapors. The canister may be filled with an appropriate adsorbent, such as activated charcoal, for temporarily trapping fuel vapors (including vaporized hydrocarbons) generated in the fuel tank. Then, during a later engine operation, when purge conditions are met, such as when the canister is saturated, the fuel vapors may be purged from the canister into the engine intake by opening canister purge valve (CPV) 112 and canister vent valve 114.

Canister 22 includes a vent 27 for routing gases out of the canister 22 to the atmosphere when storing, or trapping, fuel vapors from fuel tank 218. Vent 27 may also allow fresh air to be drawn into fuel vapor canister 22 when purging stored fuel vapors to engine intake 23 via purge lines 90 or 92 (depending on boost level) and purge valve 112. While this example shows vent 27 communicating with fresh, unheated air, various modifications may also be used. Vent 27 may include a canister vent valve 114 to adjust a flow of air and vapors between canister 22 and the atmosphere. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

Fuel vapors released from canister 22, for example during a purging operation, may be directed into engine intake manifold 160 via purge line 28. The flow of vapors along purge line 28 (e.g., purge flow) may be regulated by canister purge valve 112, coupled between the fuel vapor canister and the engine intake. The quantity and rate of vapors released by the canister purge valve 112 may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. The duty cycle may include a frequency (e.g., rate) of opening and closing the canister purge valve 112.

An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 182 coupled to intake manifold 160, and communicated with controller 12. Alternatively, MAP may be inferred from alternate engine operating conditions, such as mass air flow (MAF), as measured by a MAF sensor coupled to the intake manifold.

The low-pressure EGR loop 202 is depicted for recirculating at least some exhaust gas from the exhaust passage 170 to the air intake passage 140, upstream of the turbocharger 120, but downstream of the second oxygen sensor 175. Thus, the second oxygen sensor 175 may be positioned in the air intake passage 140, downstream of a boost side PCV hose 252 and passage 99, and upstream of the low-pressure EGR loop 202. Thus, during conditions when the LP-EGR valve 204 is open, EGR flow may affect the output of first intake air oxygen sensor 172 but not the second intake oxygen sensor 175.

Purge hydrocarbons may be directed to intake manifold 160 via either a boost path 92 or a vacuum path 90 based on engine operating conditions. Specifically, during conditions when turbocharger 120 is operated to provide a boosted aircharge to the intake manifold, the elevated pressure in the intake manifold causes one-way valve 94 in the vacuum path 90 to close while opening one-way valve 96 in the boost path 92. As a result, purge air is directed into the air intake passage 140, downstream of air filter 156 and upstream of charge air cooler 154 via the boost path 92. Herein, the purge air is introduced upstream of intake air oxygen sensor 172. In some embodiments, as depicted, a venturi 98 may be positioned in the boost path such that the purge air is directed to the intake upon passing through the venturi and passage 99. This allows the flow of purge air to be advantageously harnessed for vacuum generation.

During conditions when engine 10 is operated without boost, elevated vacuum in the intake manifold causes one-way valve 94 in the vacuum path to open while closing one-way valve 96 in the boost path. As a result, purge air is directed into the intake manifold 160, downstream of throttle 158 via the vacuum path 90. Herein, the purge air is introduced downstream of first intake air oxygen sensor 172 and second oxygen sensor 175, and therefore does not affect the outputs of first oxygen sensor 172 and second oxygen sensor 175.

PCV hydrocarbons may also be directed to intake manifold 160 via either a boost side PCV hose 252 or a vacuum side PCV hose 254 based on engine operating conditions. Specifically, blow-by gases from engine cylinders 14 flow past the piston rings and enter crankcase 255. During conditions when turbocharger 120 is operated to provide a boosted aircharge to the intake manifold, the elevated pressure in the intake manifold causes one-way valve 256 in vacuum side PCV hose 254 to close. As a result, during boosted engine operation, PCV gases flow in a first direction (arrow 264) and are received in the engine intake upstream of the intake air oxygen sensor 172. Specifically, PCV air is directed into the air intake passage 140, downstream of air filter 156 and upstream of second oxygen sensor 175 via boost side PCV hose 252. The PCV flow may be directed to the intake passage upon passage through a boost side oil separator 260. The boost side oil separator may be integrated into the cam cover or may be an external component. Thus, during boosted conditions, the PCV gases are introduced upstream of first intake air oxygen sensor 172 and second oxygen sensor 175 and therefore do affect the outputs of both oxygen sensors. The boosted conditions may include intake manifold pressure above ambient pressure.

In comparison, during conditions when engine 10 is operated without boost, elevated vacuum in the intake manifold causes one-way valve 256 in the vacuum side PCV hose 254 to open. As a result, during non-boosted engine operating, PCV gases flow in a second direction (arrow 262) different from the first direction and are received in the engine intake downstream of the intake oxygen sensor. In the depicted example, the second direction of PCV flow during non-boosted engine operation is opposite of the first direction of PCV flow during boosted engine operation (compare arrows 262 and 264). Specifically, during non-boosted operation, PCV air is directed into the intake manifold 160, directly, downstream of throttle 158 via the vacuum side PCV hose 254. The PCV flow may be directed to the intake manifold 160 upon passage through a vacuum side oil separator 258. Herein, the PCV air is introduced downstream of first intake air oxygen sensor 172 and second oxygen sensor 175, and therefore does not affect the outputs of first oxygen sensor 172 and second oxygen sensor 175. Thus, due to the specific engine configuration, during boosted engine operation, PCV and purge air hydrocarbons are ingested into the engine intake manifold upstream of the intake oxygen sensor and are ingested into the engine intake manifold downstream of the intake oxygen sensor during non-boosted conditions.

Thus the systems of FIGS. 1-2 provide for an engine system, comprising an engine including an intake manifold, a crankcase coupled to the intake manifold via a PCV valve, a turbocharger with an intake compressor, an exhaust turbine, and a charge air cooler, an intake throttle coupled to the intake manifold downstream of the charge air cooler, a canister configured to receive fuel vapors from a fuel tank, the canister coupled to the intake manifold via a purge valve, an EGR system including a passage for recirculating exhaust residuals from downstream of the turbine to upstream of the compressor via an EGR valve, a first intake oxygen sensor coupled to the intake manifold, downstream of the charge air cooler and upstream of the intake throttle, a second oxygen sensor downstream from where PCV gasses enter the intake passage and upstream of where EGR gasses enter the intake passage, and a controller with computer readable instructions for: during a first condition when the engine is boosted, determining an EGR flow based on a difference between the oxygen content measurements from two oxygen sensors and manipulating a position of the EGR valve based on the determined EGR flow, and during a second condition when the engine is not boosted, determining an EGR flow based on either a difference in the outputs from the two oxygen sensors, or only from an output of the first oxygen sensor. Learning the EGR flow includes determining a difference in the oxygen content at the two oxygen sensors when the engine is boosted, purge is enabled, and EGR is flowing above a threshold.

The computer readable instructions may further include instructions for estimating purge flow based on the change in intake oxygen during modulating the position of the purge valve, the change in intake oxygen being a change in measured intake oxygen between a first output of the second intake oxygen sensor when the purge valve is open and a second output of the second intake oxygen sensor when the purge valve is closed.

As previously discussed, the intake air oxygen sensors can be used to measure the amount of EGR in the intake aircharge as a function of the amount of difference between the oxygen content estimations of each of the sensors due to the addition of EGR as a diluent. Thus, as more EGR is introduced, one of the sensors may output a reading or pumping current corresponding to a lower oxygen concentration. Based on the outputs of the two oxygen sensors, a difference in oxygen concentration between the two sensors is learned, and an intake dilution with EGR is inferred.

FIGS. 1-2 may further provide a system for an engine, comprising: first and second parallel intake passages including first and second turbochargers, respectively, and flowing charge air into a common intake passage coupled to an intake manifold of the engine, a crankcase coupled to the second intake passage via a PCV boost path, a canister configured to receive fuel vapors from a fuel tank, the canister coupled to the second intake passage via a purge boost path, a low-pressure exhaust gas recirculation (EGR) passage coupled between an exhaust passage downstream of an exhaust turbine of the first turbocharger and the first intake passage upstream of an intake compressor of the first turbocharger, the low-pressure EGR passage including a low-pressure EGR valve, a first intake oxygen sensor disposed in the common intake passage, a second intake oxygen sensor disposed in the second intake passage downstream of where the PCV boost path and purge boost path couple to the second intake passage, and a controller with computer readable instruction for: during a first condition when the engine is boosted, adjusting the low-pressure EGR valve based on a first output of the first intake oxygen sensor and a second output of the second intake oxygen sensor. The computer readable instruction further include instructions for during a second condition when the engine is not boosted, adjusting EGR based on one of the first output of the first intake oxygen sensor, or the difference between the first output of the first intake oxygen sensor and the second output of the second oxygen sensor. The engine system may further comprise an intake throttle coupled to the intake manifold downstream of a charge air cooler and upstream of the first intake oxygen sensor.

FIGS. 1-2 may further include a system, comprising: a first oxygen sensor disposed in an intake passage downstream of an exhaust gas recirculation (EGR) inlet from an EGR passage, a second oxygen sensor disposed in the intake passage upstream of the EGR inlet and downstream of where positive crankcase ventilation (PCV) and fuel canister purge gases enter the intake passage under boosted conditions, and a controller with computer readable instruction for: adjusting EGR flow based on a first output of the first oxygen sensor and a second output of the second oxygen sensor during boosted conditions. The computer readable instructions further include instructions for adjusting the EGR flow based on a difference between the first output and the second output during boosted conditions. The computer readable instructions further include instructions for, during non-boosted conditions (e.g., when the engine is not boosted such that the turbocharger is not increasing a pressure of the intake air), adjusting the EGR flow based on one of: the first output and not the second output, or a difference between the first output and the second output. The system further comprises a turbocharger including a turbine driving a compressor and wherein boosted conditions include when the turbine is driving the compressor to provide boost to air in the intake passage. The system further comprises an exhaust passage and wherein the EGR passage routes exhaust gases from the exhaust passage downstream of the turbine and to the intake passage upstream of the compressor. The system further comprises an intake throttle coupled to an intake manifold and wherein the first intake oxygen sensor is further disposed in the intake passage downstream from the compressor and upstream from the intake throttle. The EGR passage includes an EGR valve and wherein adjusting the EGR flow includes adjusting a position of the EGR valve responsive to a difference between the first output and the second output during boosted engine operation.

FIG. 3 shows a graph 300 depicting the impact of purge and PCV air on the oxygen concentration estimated by a first intake manifold oxygen sensor (e.g. first intake air oxygen sensor 172 shown in FIGS. 1-2). Specifically, map 300 depicts an oxygen concentration estimated by an intake manifold oxygen sensor along the y-axis and a hydrocarbon (HC) content from both purge and PCV along the x-axis at a given EGR level. As the amount of purge and PCV HCs ingested into the low pressure induction system increases, such as when a purge and/or PCV valve is enabled during boosted conditions, the hydrocarbons react with oxygen at the sensing element of the intake oxygen sensor. The oxygen is consumed and water and carbon dioxide is released. As a result, the estimated oxygen concentration is reduced, even though an amount of EGR flow may remain constant. This reduction in oxygen concentration estimated by the oxygen sensor may be inferred as an increased dilution (or replacement of oxygen with EGR). Thus, the controller may infer that there is a larger amount of EGR flow available than actually is present (e.g., the controller overestimates EGR). If not corrected for the hydrocarbon effect, a controller may decrease EGR flow in response to an incorrect indication of higher EGR dilution, degrading EGR control. For example, during purge and/or PCV flow conditions resulting in EGR over-estimation, the controller may decrease an opening of the EGR valve in response to a higher EGR estimate (based on a lower intake oxygen measurement from the intake oxygen sensor). However, actual EGR may be lower than the estimated level. Thus, EGR flow may be incorrectly reduced instead of maintained or increased. This may, in turn, result in increased engine emissions and/or degraded fuel economy and/or engine performance.

As such, it will be appreciated that purge and/or PCV hydrocarbons flow into the intake manifold (directly) during non-boosted conditions. Consequently, during non-boosted conditions, the purge flow is received downstream of the intake oxygen sensor and therefore do not confound the sensor results. However during boosted condition, the purge flow is received in the low pressure air induction system, upstream of the intake oxygen sensor. As a result, during the boosted conditions only, the sensor output is confounded by the purge flow.

In one example, correcting an intake oxygen measurement based on purge and PCV flow may increase the accuracy of EGR flow estimates. Specifically, when the engine is boosted, an engine controller (such as controller 12 shown in FIG. 1) may utilize a second oxygen sensor (such as oxygen sensor 175 shown in FIGS. 1-2), positioned downstream of where PCV and purge gasses enter the intake passage, but upstream of where EGR gases enter the intake passage. Thus, both oxygen sensors may be affected by PCV and purge flow. However, only the first intake air oxygen sensor may be affected by EGR flow. Thus, the difference between the oxygen contents estimated by each oxygen sensor may correspond to the EGR flow.

Figure 4:
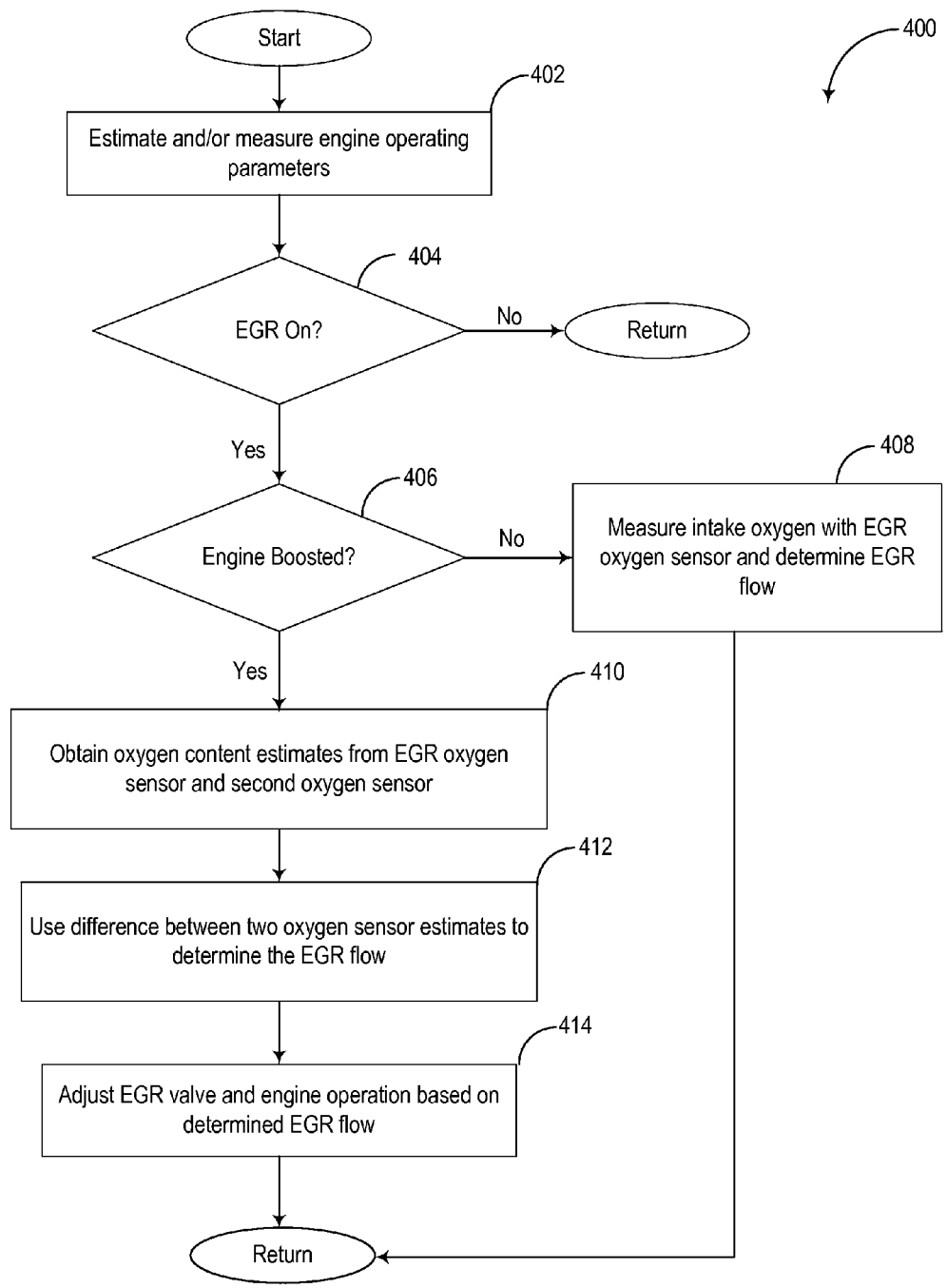
FIG. 4 is a flow chart for adjusting EGR operation based on a change in intake oxygen measured by two intake oxygen sensors.
Figure 5:
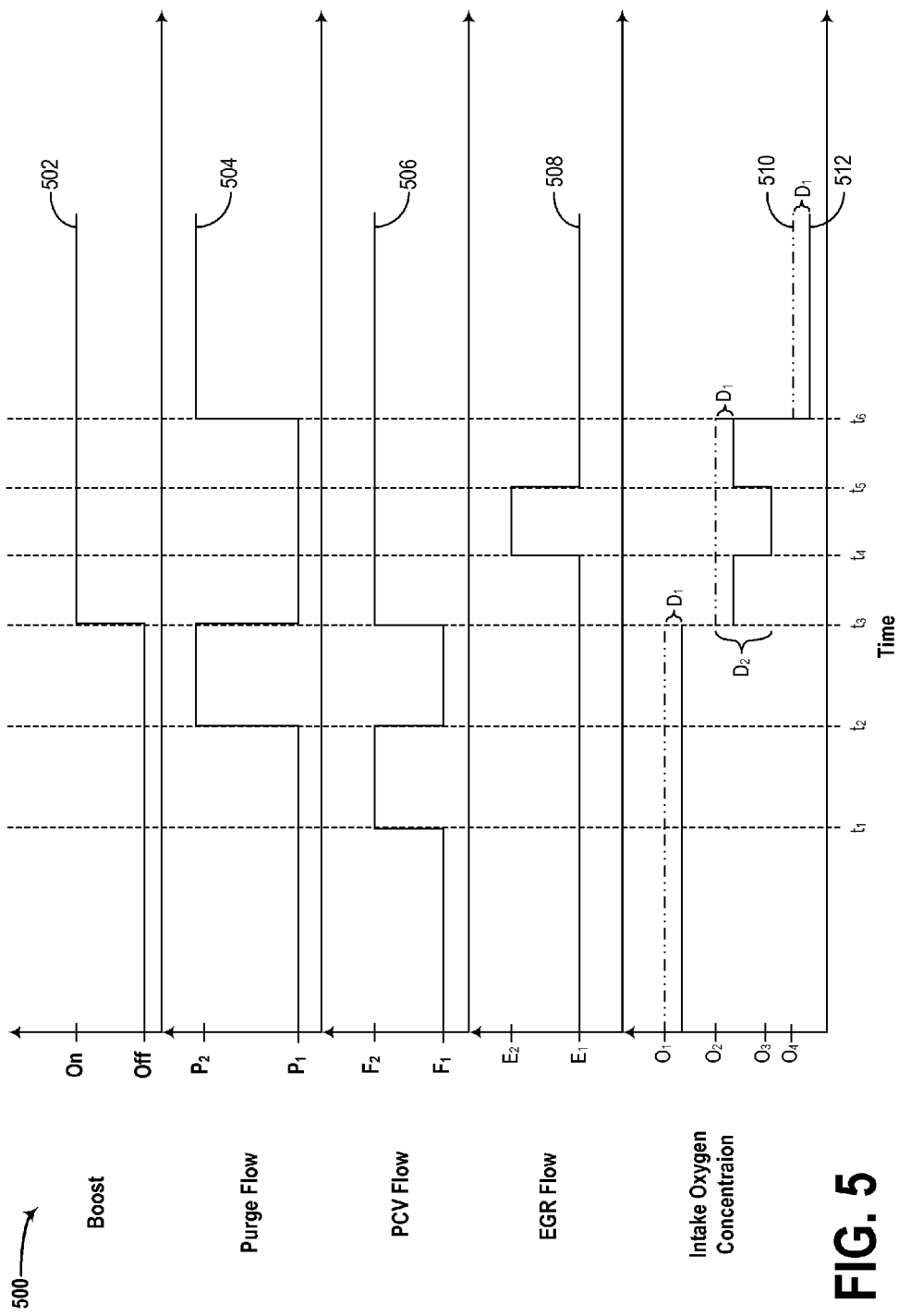
FIG. 5 is a graph depicting changes in outputs of two intake oxygen sensors in response to changes in purge, PCV, and EGR flow.

Now turning to FIG. 4, a method 400 is shown for adjusting EGR operation based on a change in intake oxygen measured by two oxygen sensors positioned at different locations in an intake system relative to an EGR passage, PCV port, and purge port. The EGR passage may be a low-pressure EGR passage flowing exhaust gases from an engine exhaust passage downstream of a turbocharger turbine to the intake passage upstream of a turbocharger compressor. As described above, when EGR is flowing, an EGR estimate based on the difference between estimates of the oxygen content of intake air from two oxygen sensors, one subject to PCV and purge gasses and not EGR gases, and one subject to PCV, purge, and EGR gasses. As a result, a more accurate EGR flow estimate may be determined, thereby resulting in increased EGR system control and reduced emissions. As described above, in one example, intake oxygen may be measured by two intake oxygen sensors, such as first oxygen sensor 172 and second intake oxygen sensor 175 shown in FIGS. 1-2. The first oxygen sensor (e.g. EGR oxygen sensor 172) may be positioned such that under boosted engine conditions, PCV, purge, and EGR gasses flow past the sensor. Second oxygen sensor (e.g. second intake oxygen sensor 175) may be positioned such that under boosted conditions, PCV and purge gasses flow past the sensor while EGR does not. Instructions for executing method 400 may be stored in a memory of a controller of the engine, such as controller 12 shown in FIG. 1.

The method begins at 402 by estimating and/or measuring engine operating conditions. In one example, engine operating conditions may include engine speed and load, torque demand, mass air flow, manifold pressure (MAP), EGR, a position of an EGR valve, a PCV valve, and fuel canister purge valve (CPV), boost, engine dilution required, engine temperature, BP, etc. At 404, the method includes determining if EGR is enabled. As discussed above, EGR may be enabled if the EGR valve (e.g., low-pressure EGR valve 204 shown in FIG. 1) is at least partially open with EGR flowing through the low-pressure EGR passage and into the engine intake. If EGR is not enabled (e.g., the EGR valve is in a closed position and EGR is not flowing), the method returns. Alternatively, if EGR is enabled at 404, the method proceeds to 406 to determine if the engine is boosted. The engine may be boosted when a turbocharger arranged between the intake passage and an exhaust passage (e.g. turbocharger 130) is supplying boost to charge air flowing through the intake passage. In one example, determining if the engine is boosted may include determining if manifold pressure is greater than the compressor inlet pressure (CIP).

If the engine is boosted at 406, the method continues on to 410 and obtains oxygen content measurements from both the first oxygen sensor (e.g., first intake oxygen sensor) and the second oxygen sensor (e.g., second intake oxygen sensor), as will be elaborated below. Thus, each oxygen sensor may be used to give two different estimates of the oxygen concentration of intake air. As described above, the first oxygen sensor is positioned downstream from where EGR gasses (e.g., low-pressure EGR gases) are recirculated, whereas the second oxygen sensor is positioned upstream of the EGR entrance point. As such, the constituents of the intake air flowing past the two sensors may be different when EGR is on. The intake air flowing past the first oxygen sensor may include hydrocarbons from PCV, purge, and EGR whereas intake air flowing past the second oxygen sensor may only include hydrocarbons from PCV and purge. The additional hydrocarbons from EGR may act as diluents such that the oxygen content of the intake air measured by the first oxygen sensor may have a lower oxygen concentration than the intake air flowing past the second oxygen sensor. As a result, the two oxygen sensors may provide different estimates of the oxygen content of intake air. Specifically, the first oxygen sensor may give a lower estimate of the oxygen content in the intake air than the second oxygen sensor.

Additionally, the method at 410 may include simultaneously obtaining a first oxygen content estimate (e.g., via a first output) from the first oxygen sensor and a second oxygen content estimate (e.g., via a second output) from the second oxygen sensor. In this way, the two oxygen content measurements from the two different oxygen sensors may be taken at the same time and compared to one another. In another example, obtaining the first oxygen content estimate from the first oxygen sensor may be slightly delayed from the time of obtaining the second oxygen content estimate from the second oxygen sensor to account for transport delays due to the difference in positions of the two sensors along the intake passage. In this way, the two oxygen sensors may be sampling approximately the same intake air.

Alternatively, if the engine is not boosted (e.g., also referred to as a non-boosted condition where MAP is less than CIP), in one embodiment the method 400 may continue on to 408 to measure the intake oxygen concentration with the first oxygen sensor and determine the change in intake oxygen from a reference point. The reference point may be an oxygen content estimated by the first oxygen sensor when the EGR valve (e.g. EGR valve 204) was closed and EGR was not flowing to the intake manifold. Thus, the method at 408 may include subtracting the intake oxygen measurement (e.g., the output from the intake oxygen sensor) from the reference point taken when EGR was off. As discussed above, the reference point may be a pre-determined point when the sensor was operating with no EGR (the zero point). Thus, the resulting value may be a total change in intake oxygen (at the intake oxygen sensor) due to diluents in the air flow (e.g., aircharge). Since the engine is not boosted, even if purge flow is enabled, it would be injected downstream from the first intake oxygen sensor, therefore not affecting the sensor measurement. Thus, in this case, the diluents in the aircharge at 408 may only be EGR (or majorly only EGR) and not hydrocarbons from purge or PCV flow. The change in oxygen concentration may then be used to infer an amount of EGR flow. The method may then return.

However, in another embodiment, if the engine if not boosted, method 400 may proceed to 410 instead of 408 as described above. Since hydrocarbons from the PCV and purge system enter the intake manifold downstream of both of the oxygen sensors when boost is off, they may not affect the measurements of either of the sensors. Thus, EGR hydrocarbons may be the only constituent present in the EGR oxygen sensor and not the second oxygen sensor. All constituents present in the air flowing past the second oxygen sensor may also be present in the air flowing past the EGR oxygen sensor. Thus, any differences in the oxygen content measured by the two sensors under non-boosted engine conditions may be the result of dilution from EGR hydrocarbons and thus may be an indication of the EGR flow. In this way, the output of the second oxygen sensors may serve as a reference to the output of the first oxygen sensor instead of using the reference point as described above at 408. As such, the two oxygen sensors may continue to be used to estimate the EGR flow both under boosted and non-boosted engine conditions.

In a further embodiment, if the engine is not boosted, the first oxygen sensor may be used exclusively to estimate the EGR flow as describe above at 408, but additionally, measurements from the second oxygen sensor may be saved in the memory of the controller (e.g. controller 12). Thus, outputs from the second oxygen sensor may be saved in the memory of the controller during non-boosted engine conditions when PCV and purge gasses are not flowing past the second oxygen sensor. When the engine is boosted, outputs from the second oxygen sensor may be compared with the saved reference outputs taken when boost was off to estimate a purge and/or PCV flow. Specifically, the oxygen concentration estimated by the second oxygen sensor when boost is enabled may be lower than the oxygen concentration estimated when boost is off due to the additional hydrocarbons from purge and/or PCV gasses flowing in the intake air. Thus, the difference between the oxygen concentrations estimated when purge is enabled and when it is off, may be indicative of an amount of purge and PCV gasses flowing past the second oxygen sensor during boosted engine conditions. Continuing from 410, the controller may use the difference between the two oxygen sensor estimates (or outputs) to determine the EGR flow at 412. Specifically, the oxygen concentration estimated by the first oxygen sensor may be subtracted from the oxygen concentration estimated by the second oxygen sensor. The remaining oxygen content may be that which is diluted or replaced by the hydrocarbons from the EGR gas. In other words, the difference in oxygen concentration estimates from the two oxygen sensors may represent the concentration of EGR gas in the intake air passing by the EGR oxygen sensor.

Once the EGR content of the intake air has been estimated at 412, method 400 may continue to 414 and adjust the EGR valve and engine operation based on the estimated EGR flow (determined at 412) and a desired EGR flow. The desired flow rate may be based on engine operating parameters such as engine load, engine speed, engine temperature, exhaust gas temperature, etc. as measured by a plurality of engine sensors. For example, if the estimated EGR flow rate is greater than a desired EGR flow rate, the controller may reduce an opening of the EGR valve to reduce the EGR flow to the desired flow rate. In another example, if the estimated EGR flow is less than the desired EGR flow rate, the controller may increase the opening of the EGR valve to increase the EGR flow rate to the desired flow rate. In some examples, additional engine operating parameters may be adjusted based on the determined EGR flow. For example, spark timing, throttle angle, and/or fuel injection may be adjusted based on the determined EGR flow.

Thus, FIG. 4 may include a method for estimating the EGR flow during both boosted and non-boosted engine conditions. The method may include, during boosted conditions, determining a difference between the intake air oxygen content as estimated by two oxygen sensors. A first oxygen sensor 172 may positioned downstream of where EGR gasses are recirculated to the intake manifold, such that during boosted engine conditions, the intake air flowing past the oxygen sensor may include hydrocarbons from PCV, purge, and EGR. The other sensor (second oxygen sensor 175) may be positioned downstream of the PCV and purge inlets, but upstream of the EGR inlet, such that during boosted conditions, only PCV and purge hydrocarbons may affect the oxygen content estimation of the oxygen sensor. Thus, during boosted conditions, the difference between the oxygen content estimations of the oxygen sensors may be representative of an EGR flow amount. During non-boosted engine conditions, the EGR flow may be estimated by either employing the same method used during boosted conditions, or by using only the first oxygen sensor 172 to estimate the oxygen content of intake air and comparing the oxygen content to a reference oxygen content estimated when EGR was disabled. Additionally, during boosted engine conditions, the second oxygen sensor 175 may be used to estimate the purge and/or PCV flow amount may by comparing the oxygen content estimated by the second oxygen sensor to a reference oxygen content estimated when boost was disabled.

In this way, as one embodiment, a method for an engine comprises: during boosted operation, adjusting exhaust gas recirculation (EGR) based on a first output of a first oxygen sensor positioned in an intake passage and exposed to EGR gases and a second output of a second oxygen sensor not exposed to EGR gases while concurrently exposed to each of positive crankcase ventilation and purge flow gases. Adjusting EGR based on the first output and the second output includes adjusting EGR based on a difference between the first output and the second output. The method further comprises when the engine is not boosted, adjusting EGR based on one of: the first output of the first oxygen sensor, or the difference between the first output of the first oxygen sensor and the second output of the second oxygen sensor. The first oxygen sensor is exposed to both EGR gases flowing from an EGR passage to the intake passage and the positive crankcase ventilation (PCV) and purge flow gases when the engine is boosted. Adjusting EGR includes adjusting a position of an EGR valve disposed in and EGR passage flowing EGR gases from an exhaust passage to the intake passage. The first oxygen sensor is positioned in the intake passage downstream of where the EGR passage couples to the intake passage. The second oxygen sensor is positioned in the intake passage upstream of where the EGR passage couples to the intake passage and downstream of where positive crankcase ventilation (PCV) and purge flow hydrocarbons enter the intake passage during boosted engine operation. The method further comprises, when the engine is boosted, estimating one or more of a purge and PCV flow based on the difference between the second output of the second oxygen sensor, and a third output of the second oxygen sensor during a condition when the engine is not boosted. In one example, the engine includes two turbochargers with a first intake passage coupled to a PCV inlet and fuel canister purge flow inlet to the first intake passage and a second intake passage coupled to the EGR passage, wherein the second oxygen sensor is positioned in the first intake passage downstream of the PCV inlet and fuel canister purge flow inlet and wherein the first oxygen sensor is positioned in a common intake passage, where gases from both the first intake passage and the second intake passage flow into the common intake passage. Boosted operation includes when a turbocharger arranged between the intake passage and an exhaust passage is supplying boost to charge air flowing through the intake passage.

Moving on to FIG. 5, a graph 500 is shown depicting changes in outputs of two intake oxygen sensors in response to changes in fuel canister purge flow, PCV flow, and EGR flow during boosted and non-boosted engine conditions. Graph 500 shows changes in boost at plot 502, purge flow at plot 504, PCV flow at plot 506, and EGR flow at plot 508. Additionally, graph 500 shows how the intake oxygen concentration as measured by a first intake oxygen sensor (plot 512) and as measured by a second intake oxygen sensor (plot 510) may change in response to changes in EGR flow, boost, purge flow, and PCV flow. Boost may be on when one or more turbochargers are operating and are supplying boost to charge air flowing through the intake passage, and may be off when said turbochargers are not operating. Purge and PCV flow may be the amount of purge and PCV gasses flowing to the intake manifold. The purge and PCV gasses may flow directly to the intake manifold without passing the oxygen sensors during non-boosted conditions. During boosted conditions, purge and PCV gasses may flow past the oxygen sensors. The first intake oxygen sensors may be first oxygen sensor 172 from FIG. 1, and the second intake oxygen sensor may be second oxygen sensor 175 from FIG. 1. First and second intake oxygen sensors may be positioned in an intake passage such that during boosted conditions, PCV and/or purge gasses may flow past the sensors and affect the outputs of the sensors. However, during non-boosted conditions, PCV and/or purge gasses may flow directly to the intake manifold without passing the sensors and affecting their outputs. Further, first oxygen sensor may be positioned downstream of where EGR gasses are recirculated such that EGR gasses may affect the output of the first oxygen sensor during boosted and non-boosted engine conditions, so long as the EGR valve (e.g. EGR valve 204) is open and EGR is being recirculated to the intake manifold.

As described above with reference to FIG. 4, two intake oxygen sensors may be used to estimate the EGR flow in a turbocharged engine. Outputs from both oxygen sensors may be affected by PCV and/or purge flow during boosted engine conditions. Thus, the hydrocarbons from purge and PCV gasses may reduce the oxygen content in the intake air registered by the two oxygen sensors. In other words, intake air may be diluted by PCV and purge gasses, and as a result may have a lower oxygen concentration which may be reflected in the estimates from the oxygen sensors. However, during non-boosted conditions, PCV and/or purge gasses do not flow past the oxygen sensors and thus do not affect their outputs. Additionally, the outputs from the first but not the second oxygen sensor are affected by changes in the EGR flow. As such, an increase in EGR flow may result in a decrease in the oxygen content of the intake air registered by the first oxygen sensor. Thus, as long as EGR is flowing, the oxygen content of the intake air as estimated by the first oxygen sensor may be lower than the oxygen content estimated by the second oxygen sensor. The difference between the oxygen content estimated by each oxygen sensor may then be used to infer an EGR flow amount. This is especially helpful during boosted conditions when the outputs of first oxygen sensor may be affected by EGR, purge, and/or PCV flow. During boosted conditions it may be difficult to distinguish the EGR flow from the PCV and/or purge flow with only the first oxygen sensor. As such, the first oxygen sensor may register the purge and/or PCV flow as additional EGR diluent and may give a higher estimate for the EGR flow than the actual EGR flow amount. Thus, the second oxygen sensor may be used to subtract out the constituents from PCV and/or purge flow that may be affecting the oxygen content registered by the first oxygen sensor. In doing so, EGR gasses flowing past the first oxygen sensor may be isolated and the EGR flow amount may be inferred.

Starting before time $t_1$, boost is off (plot 502), purge flow is at a lower first level $P_1$ (plot 504), PCV flow is at a lower first level $F_1$ (plot 506), and EGR flow is at a lower first level $E_1$ (plot 508). $P_1$ and $F_1$ may be relatively zero such that effectively no purge and/or PCV gasses are flowing to the intake manifold. In another example, $P_1$ and/or $F_1$ may be greater than zero such that purge and/or PCV gasses may be flowing to the intake manifold. However, since boost is off before $t_1$, any purge and/or PCV gasses flowing to the intake manifold may not pass by either of the oxygen sensors, and as such may not affect the oxygen content estimated by the oxygen sensors. $E_1$ may be greater than zero and as such may affect the output of the first oxygen sensor as seen at plot 512. Specifically, due to EGR gasses flowing at the first level $E_1$ before time $t_1$, the first oxygen sensor may estimate a lower oxygen concentration than the second oxygen sensor (plot 510). The second oxygen sensor may estimate a first higher oxygen concentration $O_1$, and the difference between the oxygen concentrations estimated by the two oxygen sensors may be an amount $D_1$ such that the oxygen concentration estimated by the first oxygen sensor is less than $O_1$ by a lower first amount $D_1$. Thus, $D_1$ may be the same or relatively the same as the amount of EGR flow, $E_1$ before $t_1$.

At time $t_1$, PCV flow increases from the lower first level $F_1$ to a higher second level $F_2$ as seen at plot 506. Boost remains off at $t_1$, and purge and EGR flow remain at their respective lower first levels $P_1$ and $E_1$. Because the engine is not boosted at $t_1$, neither the first nor second oxygen sensors are affected by the increase in PCV flow and thus the oxygen concentrations measured by the oxygen sensors remain the same as before $t_1$. Thus, the oxygen concentration estimated by the second oxygen sensor remains at $O_1$ after $t_1$, and the oxygen concentration estimated by the first oxygen sensor is less than $O_1$ by the same amount $D_1$. As described earlier $D_1$ may represent the amount of EGR flow $E_1$ flowing past the first oxygen sensor.

At time $t_2$, purge flow increases from the lower first level $P_1$ to a higher second level $P_2$ as seen at plot 504. Concurrently, PCV flow decreases form the higher second level $F_2$ to the lower first level $F_1$ as seen at plot 506 at $t_2$. Boost remains off at $t_2$, and EGR flow remains at the lower first level $E_1$. Because the engine is not boosted at $t_2$, neither the first nor second oxygen sensors are affected by the increase in purge flow or the decrease in PCV flow and thus the oxygen concentrations measured by the oxygen sensors remain the same after $t_2$ as before $t_2$. Thus, the oxygen concentration estimated by the second oxygen sensor remains at $O_1$ after $t_2$, and the oxygen concentration estimated by the first oxygen sensor is less than $O_1$ by the same amount $D_1$. As described earlier $D_1$ may represent the amount of EGR flow $E_1$ flowing past the first oxygen sensor.

At time $t_3$, purge flow decreases from the higher second level $P_2$ to the lower first level $P_1$ as seen at plot 504. Concurrently, PCV flow increases form the lower first level $F_1$ to the higher second level $F_2$ as seen at plot 506 at $t_3$. EGR flow remains at its lower first level $E_1$. Boost is turned on at $t_3$, and as a result the PCV and negligible purge gasses start flowing past the two oxygen sensors (e.g., past both of the first and second intake oxygen sensors). In response to PCV and purge constituents in the intake air, the oxygen concentration estimated by the second oxygen sensor (plot 510) decreases from the higher first level $O_1$, to a lower second level $O_2$. Correspondingly, the oxygen concentration estimated by the first oxygen sensor (plot 512) decreases by a similar amount to that of the second oxygen sensor such that it is less than $O_2$ by the amount $D_1$. Thus, at $t_3$, the oxygen concentration as estimated by the two oxygen sensors may decrease by relatively the same amount as a result of both sensors being exposed to intake air comprising relatively equal amounts of PCV and purge gasses.

At time $t_4$, boost remains on, purge flow remains at the lower first level $P_1$, and PCV remains at the higher second level $F_2$. Thus, at $t_4$, the oxygen concentration estimated by the second oxygen sensor remains relatively the same at second level $O_2$. However, at $t_4$ EGR flow increases from the lower first level $E_1$ to a higher second level $E_2$. In response to the increase in EGR flow, the oxygen concentration estimated by the first oxygen sensor decreases to a third level $O_3$ that may be less than $O_2$ such that the difference between the oxygen concentrations measured by the two oxygen sensors increases from the lower first amount $D_1$ to a higher second amount $D_2$. The difference between $D_1$ and $D_2$ may be proportional to the difference between $E_1$ and $E_2$. Thus, the amount of increase in EGR flow at $t_4$ may cause a corresponding amount of decrease in the oxygen concentration estimated by the first oxygen sensor. As such, the difference between the oxygen concentrations, $O_2$ and $O_3$, estimated at $t_4$, may represent the EGR flow $E_2$ at $t_4$.

At time $t_5$, boost remains on, purge flow remains at $P_1$, and PCV remains at $F_2$. Thus, at $t_5$, the oxygen concentration estimated by the second oxygen sensor remains relatively the same at second level $O_2$. However, at $t_5$ EGR flow decreases from the higher second level $E_2$ to the lower first level $E_1$. In response to the decrease in EGR flow, the oxygen concentration estimated by the first oxygen sensor increases from $O_3$ back to a level similar to that at $t_3$ such that the difference between the oxygen concentrations measured by the two oxygen sensors decreases from the higher second amount $D_2$ to a lower first amount $D_1$. Thus at $t_5$, the oxygen concentration estimated by the first oxygen sensor may be less than $O_2$ by the amount $D_1$, where $D_1$ may represent the lower first EGR flow $E_1$.

At time $t_6$, boost remains on, EGR flow remains at $E_1$, and PCV remains at $F_2$. However, at $t_6$ purge flow increases from the lower first level $P_1$ to the higher second level $P_2$. Thus, in response to the increase in purge flow at $t_5$, the oxygen concentration estimated by the second oxygen sensor decreases from $O_2$ to a lower fourth level $O_4$. Correspondingly, the oxygen concentration estimated by the first oxygen sensor decreases by a similar amount to that of the second oxygen sensor such that it is less than $O_4$ by the amount $D_1$. $D_1$ may directly relate to the amount of EGR flow $E_1$ at time $t_6$.

Thus, FIG. 5 shows how the oxygen concentrations measured by two different intake oxygen sensors, a first oxygen sensor positioned downstream and the second positioned upstream of an EGR inlet to the intake passage, may be affected by changes in engine operating conditions. Both oxygen sensors may be affected similarly by changes in the PCV, and purge flow during boosted engine conditions. Specifically, an increase in purge and/or PCV flow may result in a decrease in the oxygen concentration estimated by the two sensors. During non-boosted engine conditions, the oxygen concentrations estimated by the oxygen sensors may be unaffected by changes in the PCV and purge flow. Under both boosted and non-boosted engine conditions, changes in the EGR flow may affect outputs of the first oxygen sensor positioned downstream of where EGR gas enters the intake passage. Specifically, increases in EGR flow may result in a decrease in the oxygen concentration estimated by the oxygen sensor. Further, the difference between the oxygen concentrations estimated by the two oxygen sensors may relate to an amount of EGR flow. Thus, the EGR flow may be estimated based on the difference between the oxygen concentrations estimated by the two oxygen sensors.

In this way, the systems and methods described herein may increase the accuracy of estimations of the EGR flow during boosted engine conditions. Specifically, the difference between oxygen concentrations estimated using two different intake oxygen sensors may be used to infer an EGR flow during both boosted and non-boosted engine conditions. A first oxygen sensor may be positioned downstream of where EGR gas is recirculated, and downstream of where PCV and purge gasses are introduced to an engine system during boosted engine conditions. A second oxygen sensor may be positioned such that it does not receive EGR gasses, but such that it does receive purge and/or PCV gasses during boosted engine conditions. Thus, when EGR is enabled, oxygen concentrations estimated using the first oxygen sensor may be lower than estimates using the second oxygen sensor. The outputs of both the oxygen sensors may be affected similarly by increases in the PCV and/or purge flows during boosted engine conditions. The difference between the oxygen concentration estimations of the two oxygen sensors may be indicative of an EGR flow amount.

Thus, a technical effect of determining the EGR flow during boosted engine conditions is achieved by comparing oxygen concentration estimates from the two oxygen sensors where one oxygen sensor is subjected to EGR flow and the other is not. Specifically, the oxygen concentration estimated by the oxygen sensor in the path of EGR flow may be subtracted from the oxygen concentration estimate by the oxygen sensor not in the path of EGR flow. The difference between the two oxygen concentration estimates may directly relate to the amount of EGR flow. During non-boosted engine conditions, the two sensors may continue to be used to estimate the EGR flow. Alternatively during non-boosted engine conditions, the first sensor may be used exclusively to estimate the EGR flow. The oxygen sensor may compare current oxygen concentration estimates to ones taken when EGR was not flowing to establish the EGR flow amount.

In another representation, a method for an engine comprises: during both boosted and non-boosted conditions, determining the EGR flow based on a difference between a first output of a first oxygen sensor and a second output of a second oxygen sensor, where both sensors are exposed to PCV and purge gasses during boosted engine operation, and where only one of the sensors is exposed to EGR gasses during both boosted and non-boosted engine conditions.

In yet another representation, a method for an engine comprises: during boosted conditions determining an EGR flow based on a difference between a first output of a first oxygen sensor and a second output of a second oxygen sensor and during non-boosted conditions determining the EGR flow based on a difference between a first output of the first oxygen sensor and a second output of the oxygen sensor, where the second output of the oxygen sensor is taken when EGR gas is not flowing and where the first output is taken when EGR gas is flowing. The first oxygen sensor may be exposed to EGR flow and purge and PCV flow when the engine is boosted. The second oxygen sensor may be exposed to purge and PCV flow when the engine is boosted and not EGR flow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during boosted operation, adjusting exhaust gas recirculation (EGR) based on a first output of a first oxygen sensor positioned in an intake passage and exposed to EGR gases and a second output of a second oxygen sensor not exposed to EGR gases and exposed to positive crankcase ventilation and purge flow gases.

2. The method of claim 1, wherein adjusting EGR based on the first output and the second output includes adjusting EGR based on a difference between the first output and the second output, and wherein the second output is of the second oxygen sensor concurrently not exposed to EGR gases and exposed to each of positive crankcase ventilation and purge flow gases.

3. The method of claim 1, further comprising, when the engine is not boosted, adjusting EGR based on one of: the first output of the first oxygen sensor, or the difference between the first output of the first oxygen sensor and the second output of the second oxygen sensor.

4. The method of claim 1, wherein the first oxygen sensor is exposed to both EGR gases flowing from an EGR passage to the intake passage and the positive crankcase ventilation (PCV) and purge flow gases when the engine is boosted.

5. The method of claim 1, wherein adjusting EGR includes adjusting a position of an EGR valve disposed in and EGR passage flowing EGR gases from an exhaust passage to the intake passage.

6. The method of claim 5, wherein the first oxygen sensor is positioned in the intake passage downstream of where the EGR passage couples to the intake passage.

7. The method of claim 5, wherein the second oxygen sensor is positioned in the intake passage upstream of where the EGR passage couples to the intake passage and downstream of where positive crankcase ventilation (PCV) and purge flow hydrocarbons enter the intake passage during boosted engine operation.

8. The method of claim 7 further comprising, when the engine is boosted, estimating one or more of a purge and PCV flow based on a difference between the second output of the second oxygen sensor and a third output of the second oxygen sensor during a condition when the engine is not boosted.

9. The method of claim 5, wherein the engine includes two turbochargers with a first intake passage coupled to a PCV inlet and fuel canister purge flow inlet to the first intake passage and a second intake passage coupled to the EGR passage, wherein the second oxygen sensor is positioned in the first intake passage downstream of the PCV inlet and fuel canister purge flow inlet and wherein the first oxygen sensor is positioned in a common intake passage, where gases from both the first intake passage and the second intake passage flow into the common intake passage.

10. The method of claim 1, wherein boosted operation includes when a turbocharger arranged between the intake passage and an exhaust passage is supplying boost to charge air flowing through the intake passage.

11. A system, comprising:
a first oxygen sensor disposed in an intake passage downstream of an exhaust gas recirculation (EGR) inlet from an EGR passage;
a second oxygen sensor disposed in the intake passage upstream of the EGR inlet and downstream of where positive crankcase ventilation (PCV) and fuel canister purge gases enter the intake passage under boosted conditions; and
and a controller with computer readable instruction for:
adjusting EGR flow based on a first output of the first oxygen sensor and a second output of the second oxygen sensor during boosted conditions.

12. The system of claim 11, wherein the computer readable instructions further include instructions for adjusting the EGR flow based on a difference between the first output and the second output during boosted conditions.

13. The system of claim 11, wherein the computer readable instructions further include instructions for, during non-boosted conditions, adjusting the EGR flow based one of the first output and not the second output, or a difference between the first output and the second output.

14. The system of claim 11, further comprising a turbocharger including a turbine driving a compressor and wherein boosted conditions include when the turbine is driving the compressor to provide boost to air in the intake passage.

15. The system of claim 14, further comprising an exhaust passage and wherein the EGR passage routes exhaust gases from the exhaust passage downstream of the turbine and to the intake passage upstream of the compressor.

16. The system of claim 14, further comprising an intake throttle coupled to an intake manifold and wherein the first intake oxygen sensor is further disposed in the intake passage downstream from the compressor and upstream from the intake throttle.

17. The system of claim 11, wherein the EGR passage includes an EGR valve and wherein adjusting the EGR flow includes adjusting a position of the EGR valve responsive to a difference between the first output and the second output during boosted engine operation.

18. A system for an engine, comprising:
first and second parallel intake passages including first and second turbochargers, respectively, and flowing charge air into a common intake passage coupled to an intake manifold of the engine;
a crankcase coupled to the second intake passage via a PCV boost path;
a canister configured to receive fuel vapors from a fuel tank, the canister coupled to the second intake passage via a purge boost path;
a low-pressure exhaust gas recirculation (EGR) passage coupled between an exhaust passage downstream of an exhaust turbine of the first turbocharger and the first intake passage upstream of an intake compressor of the first turbocharger, the low-pressure EGR passage including a low-pressure EGR valve;
a first intake oxygen sensor disposed in the common intake passage;
a second intake oxygen sensor disposed in the second intake passage downstream of where the PCV boost path and purge boost path coupled to the second intake passage; and
a controller with computer readable instruction for:
during a first condition when the engine is boosted, adjusting the low-pressure EGR valve based on a first output of the first intake oxygen sensor and a second output of the second intake oxygen sensor.

19. The system of claim 18, wherein the computer readable instructions further include instructions for: during a second condition when the engine is not boosted, adjusting EGR based on one of the first output of the first intake oxygen sensor, or a difference between the first output of the first intake oxygen sensor and the second output of the second oxygen sensor.

20. The system of claim 18, wherein the adjusting the low-pressure EGR valve includes adjusting the low-pressure EGR valve based on a difference between the first output and the second output and further comprising, an intake throttle coupled to the intake manifold downstream of a charge air cooler and upstream of the first intake oxygen sensor.

* * * * *